H. Fischer,
Bung Lock.
No. 108,897.    Patented Nov. 1, 1870.
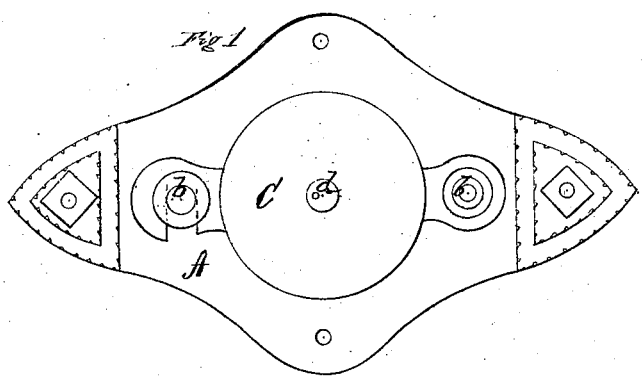
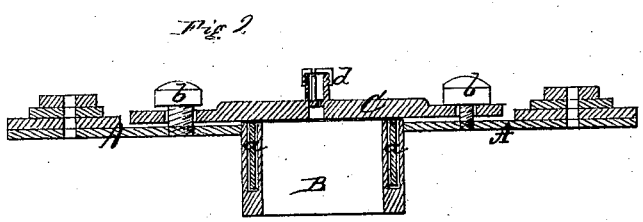
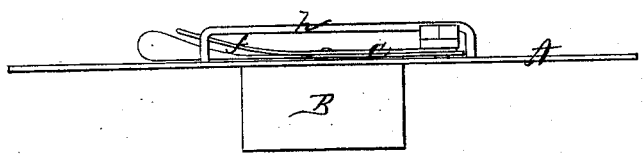
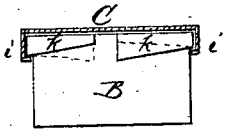
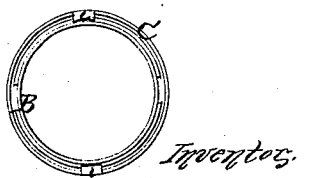
Witnesses
Harry King
C. S. Evert
Inventor
Herman Fischer
per Alexander Mason
Atty.

United States Patent Office.

HERMANN FISCHER, OF LANESVILLE, INDIANA.

Letters Patent No. 108,897, dated November 1, 1870.

IMPROVEMENT IN BUNG-LOCKS.

The Schedule referred to in these Letters Patent and making part of the same.

*To all whom it may concern:*

Be it known that I, HERMANN FISCHER, M. D., of Lanesville, in the county of Harrison and State of Indiana, have invented certain new and useful Improvements in Bung-Locks; and do hereby declare that the following is a full, clear, and exact description thereof, reference being had to the accompanying drawing and to the letters of reference marked thereon, making a part of this specification.

The nature of my invention consists in the construction and arrangement of a "bung-lock," closed by means of a lid, as will be hereinafter fully set forth.

In order to enable others skilled in the art to which my invention appertains to make and use the same, I will now proceed to describe its construction and operation, referring to the annexed drawing, in which—

Figure 1 is a plan view, and

Figure 2 is a longitudinal vertical section of my improved bung-lock.

Figures 3, 4, and 5, are views showing different modes of fastening the lid.

A represents the plate, of any suitable dimensions, provided with an opening corresponding in size with the bung-hole of the keg, barrel, or other vessel on which it is to be used.

This plate is screwed tightly onto the vessel, and in the opening on said plate is secured a collar or casing, B, which projects downward through the bung-hole.

The upper edge of the casing B is grooved for the insertion of a strip, $a$, of leather, which acts as a washer to keep tight when the lid C is placed on the same, covering the opening.

This lid is secured by screws $b\ b$ to the plate A, said screws passing through projections on opposite sides of the lid.

In the center of the lid C is a small screw, $d$, with valve for the purpose of letting air into the vessel.

The lid C may be secured in various other ways, for instance, as shown in fig. 3, pivoted at one end and held down by a spring, $f$, which bears against a guide, $h$, secured on the plate A; or the casing B may project above the plate A, and have increasing ridges, $k\ k$, and the lid C be in the shape of a shallow cap, with hooks, $i\ i$, as shown in figs. 4 and 5; or the cap may be screwed on.

Hence, I do not confine myself to any particular mode of securing the cap or lid.

Having thus described my invention,

What I claim as new, and desire to secure by Letters Patent, is—

In combination with the plate A and casing B, the lid C, provided with the valve $d$ and secured to the plate by any suitable means, substantially for the purposes herein set forth.

In testimony that I claim the foregoing, I have hereunto set my hand, this 4th day of August, 1870.

HERMANN FISCHER, M. D.

Witnesses:
 PHILIP ZERBEL,
 CHARLES SEIB.